United States Patent
Cierniak

(10) Patent No.: US 9,875,306 B2
(45) Date of Patent: Jan. 23, 2018

(54) NAVIGATION THROUGH A COLLECTION OF ELECTRONIC DOCUMENTS

(75) Inventor: Michal Cierniak, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1222 days.

(21) Appl. No.: 12/914,204

(22) Filed: Oct. 28, 2010

(65) Prior Publication Data

US 2015/0193537 A1    Jul. 9, 2015

Related U.S. Application Data

(60) Provisional application No. 61/378,175, filed on Aug. 30, 2010.

(51) Int. Cl.
    *G06F 17/30*      (2006.01)
    *G06Q 50/00*      (2012.01)

(52) U.S. Cl.
    CPC ....... *G06F 17/30867* (2013.01); *G06Q 50/01* (2013.01)

(58) Field of Classification Search
    CPC ......... G06F 17/30861; G06F 17/30864; G06F 17/3087; G06F 17/30867
    USPC ...................................................... 707/706
    See application file for complete search history.

(56) References Cited

U.S. PATENT DOCUMENTS

| | | | | |
|---|---|---|---|---|
| 8,190,602 B1 * | 5/2012 | James | ............... | G06F 17/30873 707/726 |
| 8,676,875 B1 * | 3/2014 | Smith | ................... | G06Q 50/01 707/E17.014 |
| 2002/0169771 A1 * | 11/2002 | Melmon | ........... | G06F 17/30011 707/999.005 |
| 2004/0267730 A1 * | 12/2004 | Dumais | ............. | G06F 17/30613 707/999.003 |

(Continued)

OTHER PUBLICATIONS

Carmel et al.; "Personalized social search based on the user's social network"; Nov. 2, 2009; CIKM '09 Proceedings of the 18th ACM conference on Information and knowledge management; pp. 1227-1236.*

(Continued)

*Primary Examiner* — Ashish K Thomas
*Assistant Examiner* — Jedidiah Ferrer
(74) *Attorney, Agent, or Firm* — Fish & Richardson P.C.

(57) ABSTRACT

Methods, systems, and apparatus, including computer programs encoded on a computer storage medium, for improving navigation through an electronic document collection. In one aspect, an apparatus includes a search engine system comprising a communication interface in data communication with a client terminal, a database persistently storing information characterizing electronic documents available on the Internet, a search constraint setting database persistently storing information characterizing settings for supplemental searches, and a search engine programmed to perform, in response to receipt of the information characterizing (Continued)

the entities named in the electronic document displayable at the client terminal, supplemental searches on the database to identify a responsive subset of the electronic documents available on the Internet. The supplemental searches are constrained by at least one of the named entities and the supplemental search settings stored at the search constraint setting database.

15 Claims, 10 Drawing Sheets

(56) References Cited

U.S. PATENT DOCUMENTS

| | | | |
|---|---|---|---|
| 2008/0301112 A1* | 12/2008 | Wu | G06Q 30/02 707/999.005 |
| 2008/0319943 A1* | 12/2008 | Fischer | G06F 17/30554 707/E17.14 |
| 2009/0282002 A1* | 11/2009 | Reeder | G06Q 30/02 707/E17.014 |
| 2010/0082593 A1* | 4/2010 | Singh | G06F 17/30864 707/707 |
| 2010/0082652 A1* | 4/2010 | Jones | G06Q 30/02 707/758 |
| 2010/0121707 A1* | 5/2010 | Goeldi | 705/14.49 |
| 2010/0174709 A1* | 7/2010 | Hansen | G06F 17/3087 707/728 |
| 2011/0035350 A1* | 2/2011 | Zwol | G06F 17/241 706/46 |
| 2011/0047275 A1* | 2/2011 | Jones | G06F 17/30867 707/770 |
| 2011/0179388 A1* | 7/2011 | Fleizach et al. | 715/840 |
| 2011/0252011 A1* | 10/2011 | Morris | H04L 12/185 707/706 |
| 2011/0320423 A1* | 12/2011 | Gemmell | G06F 17/30867 707/706 |
| 2012/0110009 A1* | 5/2012 | Kraft et al. | 707/769 |
| 2014/0032529 A1* | 1/2014 | Chang | G06F 17/30554 707/722 |

OTHER PUBLICATIONS

Gopalakrishnan, Vijay, "System Support for Keyword-Based Search in Structured Peer-to-Peer Systems," Dissertation, Department of Computer Science, Graduate School of the University of Maryland (2006).

Ibrahim et al., "Automatic Prefetching by Traversal Profiling in Object Persistence Architectures," Proc. of the European Conference on Object-Oriented Programming (ECOOP), p. 1-24 (2006).

Prakash et al., "Efficient XML Query Processing in RDBMS Using GUI-Driven Prefetching in a Single-User Environment," DASFAA, LNCS 4443:819-833 (2007).

Venketesh et al., "Semantic Web Prefetching Scheme Using Naïve Bayes Classifier," International Journal of Computer Science and Applications, 7(1):66-78 (2010).

Xu et al., "A Keyword-Based Semantic Prefetching Approach in Internet News Services," IEEE Transactions on Knowledge and Data Engineering, 16(5):601-611 (2004).

\* cited by examiner

FIG. 9

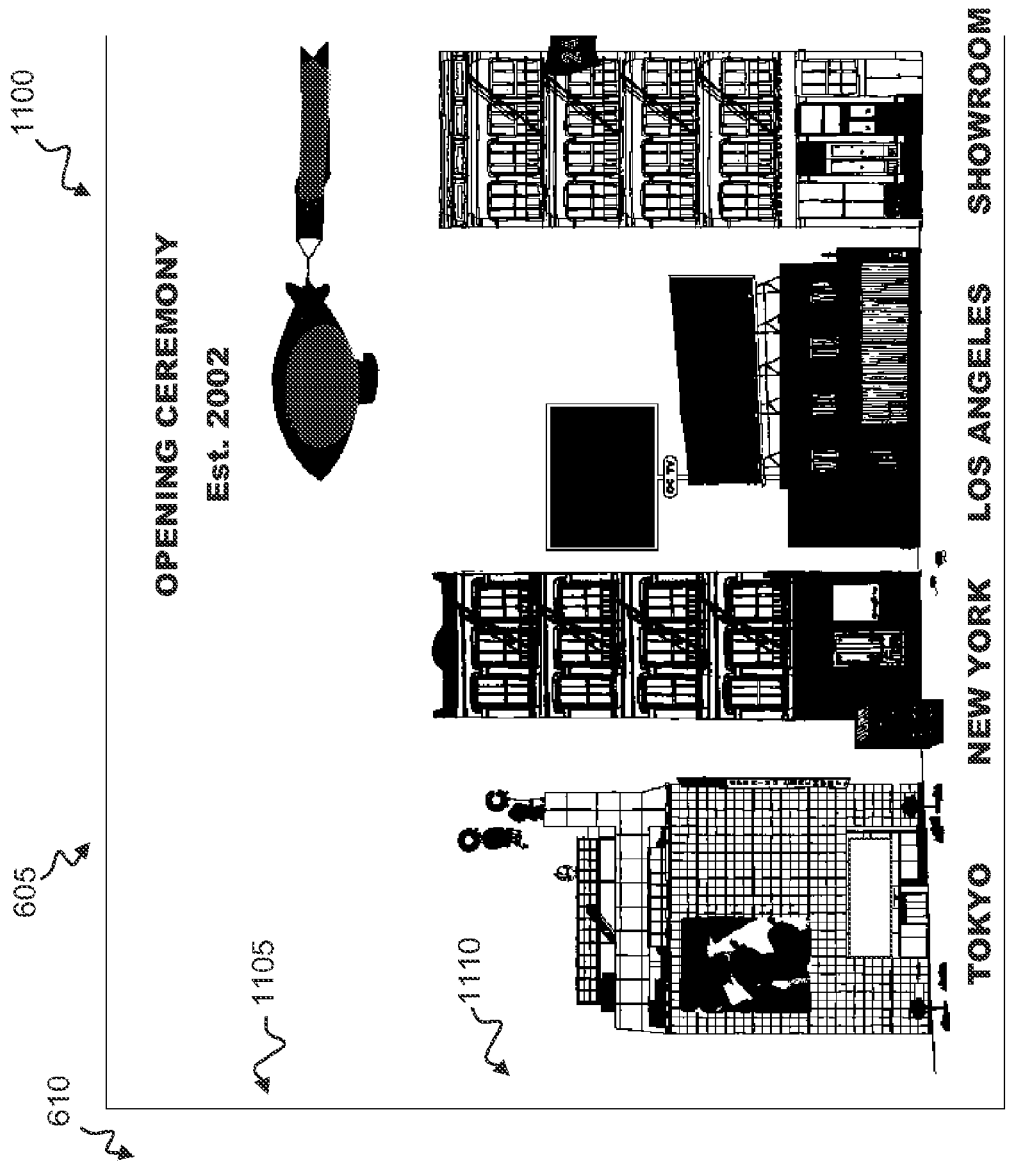
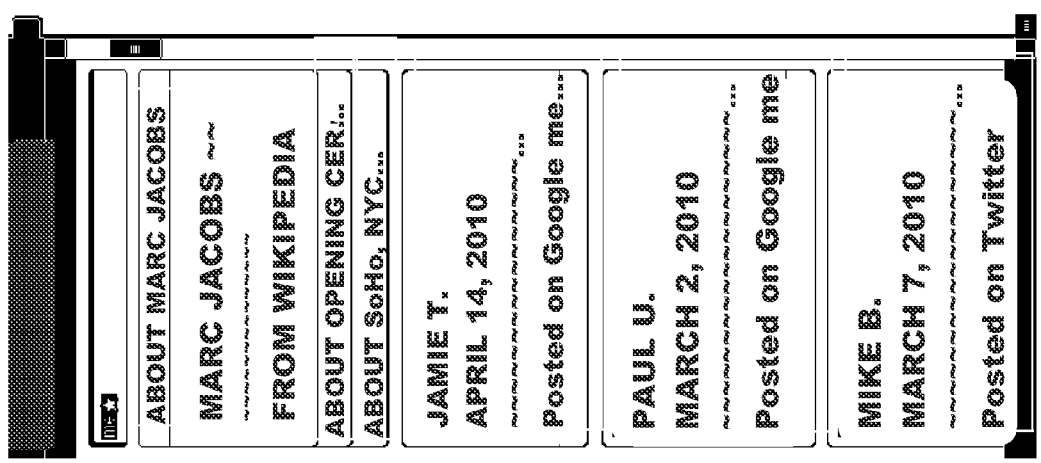
FIG. 11

NAVIGATION THROUGH A COLLECTION OF ELECTRONIC DOCUMENTS

CROSS-REFERENCE TO RELATED APPLICATIONS

This application claims priority to U.S. Provisional Application Ser. No. 61/378,175, filed on Aug. 30, 2010, the contents of which are incorporated herein by reference.

BACKGROUND

This specification relates to digital data processing and, in particular, document collection navigation.

An electronic document is a collection of machine-readable data. Electronic documents are generally individual files and are formatted in accordance with a defined format (e.g., PDF, TIFF, HTML, MS Word, PCL, PostScript, or the like). Electronic documents can be electronically stored and disseminated. In some cases, electronic documents include audio content, visual content, and other information, as well as text and links to other electronic documents. A document may be stored in a portion of a file that holds other documents, in a single file dedicated to the document in question, or in multiple coordinated files.

SUMMARY

This specification describes systems and techniques in which entity names or other information in the current context displayed for a user is used to conduct supplemental searches. The supplemental searches can identify electronic documents that supplement the currently displayed context. Further, characteristics of the supplemental searches can be set by the user beforehand. The results of the supplemental searches can be displayed, e.g., in a sidebar in a web browser that can be opened or closed as the user desires.

In a first aspect, an apparatus includes a user terminal comprising a communication interface operable to communicate data with a search engine system, a display device, and one or more data processing devices programmed to perform operations in accordance with the logic of one or more sets of machine-readable instructions. The operations include displaying, on the display device, a user interface comprising descriptions of various settings for supplemental searches performable by the search engine system, receiving user input over an input element setting a first of the supplemental search settings, transmitting one or more messages characterizing the setting of the first supplemental search setting to the search engine system in response to the receipt of the user input, displaying subsequently a first electronic document identifying a first entity and a first supplemental search result, the first supplemental search result identifying a first electronic document relevant to the first entity and identified in accordance with the first of the supplemental search settings, and displaying subsequently a second electronic document identifying a second entity and a second supplemental search result, the second supplemental search result identifying a second electronic document relevant to the second named entity and identified in accordance with the first of the supplemental search settings.

In a second aspect, an apparatus includes a search engine system comprising a communication interface in data communication with a client terminal, the communication interface operable to receive information characterizing entities named in an electronic document displayable at the client terminal, a database persistently storing on one or more data storage devices information characterizing electronic documents available on the Internet, a search constraint setting database persistently storing on one or more data storage devices information characterizing settings for supplemental searches, and a search engine implemented on one or more data processing devices and programmed to perform, in response to receipt of the information characterizing the entities named in the electronic document displayable at the client terminal by the communication interface, supplemental searches on the database to identify a responsive subset of the electronic documents available on the Internet, wherein the supplemental searches are constrained by at least one of the named entities and the supplemental search settings stored at the search constraint setting database.

In a third aspect, a computer-implemented method includes receiving an identification of a user, providing a user interface comprising a description of a supplemental search setting, wherein the supplemental search setting sets a constraint that can be used to constrain electronic documents responsive in a search to identify electronic documents that supplement context currently displayed for the user, receiving user input setting the supplemental search to occur, and transmitting information characterizing the supplemental search setting and the user to a search engine system in response to the receipt of the user interaction.

In a fourth aspect, a method is performed by a search engine system implemented by one or more data processing devices. The method includes receiving, at the search engine system, an identifier of a first user and information characterizing a current context displayed for the first user at a first remote client terminal, identifying, by the search engine system, a first supplemental search setting that has been set by the first user, the first supplemental search setting being found in a database that persistently stores on one or more data storage devices information characterizing settings for supplemental searches, searching, by the search engine system, an electronic document collection for electronic documents, the search embodying both the current context displayed for the first user and the first supplemental search setting that has been set by the first user, transmitting information characterizing the results of the search from the search engine system to the first remote client terminal, receiving, at the search engine system, an identifier of a second user and information characterizing a current context displayed for the second user at a second remote client terminal, identifying, by the search engine system, a second supplemental search setting that has been set by the second user, the second supplemental search setting being found in the database, searching, by the search engine system, the electronic document collection for electronic documents, the search embodying both the current context displayed for the second user and the second supplemental search setting that has been set by the second user; and transmitting information characterizing the results of the search from the search engine system to the second remote client terminal.

These four and other aspects can include one or more of the following features. A user interface can include a first input element operative to receive a user specification of a node in a social network that is to author content of the documents responsive to the supplemental searches. One or more messages characterizing the setting of the first supplemental search setting can include information characterizing the user-specified node. A user interface can include a first input element operative to receive a user specification of a domain to which supplemental searchers are to be constrained. One or more messages characterizing the setting of the first supplemental search setting can include information characterizing the user-specified domain. A user interface can include information identifying a document type to which documents responsive to the first supplemental search are constrained. A user interface can include information identifying a domain in which documents responsive to the first supplemental search are constrained to be found. One or more data processing devices can also be programmed to transmit one or more messages identifying the user from whom the setting of the first of the supplemental search settings is received. Information characterizing the electronic document received by the communication interface can include one or more entity names found in the text of the electronic document. Supplemental searches can include the one or more entity names as query constraints. A search engine can be implemented to identify entity names found in the text of the electronic document. Supplemental searches can include the one or more entity names as query constraints. A search constraint setting database can persistently store an identifier of a user and, in association with the user identifier, an identifier of a first of the supplemental searches. A search engine can be programmed to receive information identifying a user at the client terminal and locate the first supplemental search identifier using the received user identifier. A communication interface can be operable to receive from the client terminal a value of an attribute. A search constraint setting database can persistently store the value in association with an identifier of a user. A search engine can be programmed to conduct constrain a supplemental search to return electronic documents responsive to the value of the attribute. A search constraint setting database can persistently store an identifier of a domain. A search engine can be programmed to constrain the responsive subset of the electronic documents to those found in the identified domain. A search constraint setting database can persistently store an identifier of an individual or a group of individuals. A search engine can be programmed to constrain the responsive subset of the electronic documents to those authored by the identified individual or group of individuals. Supplemental searches can be constrained by search queries formulated to embody the at least some of the received information characterizing the electronic document displayable at the client terminal and the supplemental search settings. A database can include a collection of databases constrained to persistently storing information characterizing a proper subset of the electronic documents available on the Internet. Supplemental searches can be constrained by the search engine searching only those of the collection of databases that are constrained to persistently storing information characterizing electronic documents responsive to the supplemental search settings stored at the search constraint setting database. An interactive input element can be displayed on the user interface. The interactive input element can be associated with the description of the supplemental search setting by virtue of positioning an arrangement on the display device. User interaction with the interactive input element can be received. Names of entities found in text of the current context displayed for the first user and in text of the current context displayed for the second user can be searched.

The details of various implementations are set forth in the accompanying drawings and the description below. Other features, aspects, and advantages will become apparent from the description, the drawings, and the claims.

BRIEF DESCRIPTION OF THE DRAWINGS

FIGS. 6-9 and 11 are schematic representations of example portions of user interfaces that can display results of supplemental searches to users.

Like reference numbers and designations in the various drawings indicate like elements.

DETAILED DESCRIPTION

Figure 1:
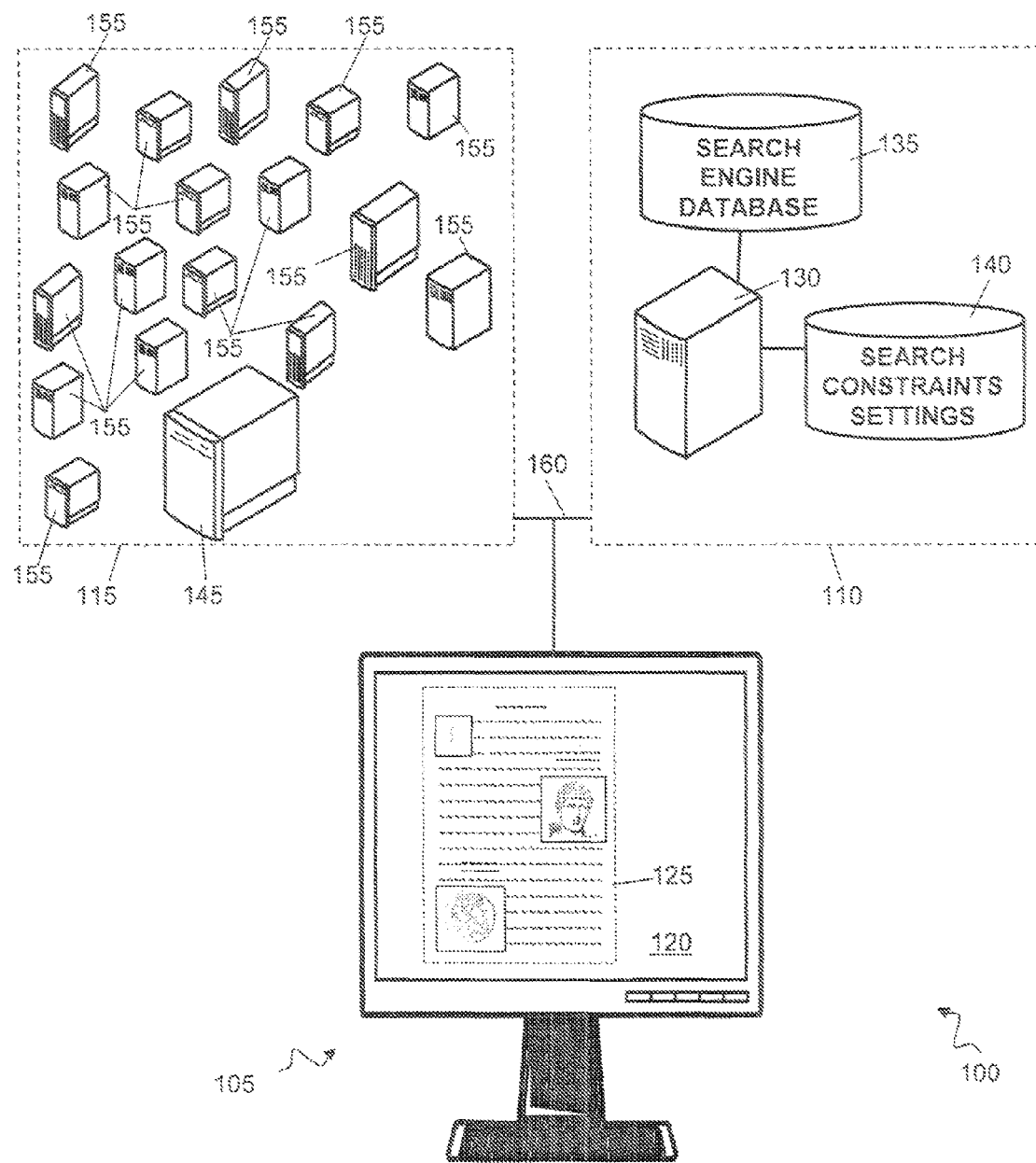
FIG. 1 is a schematic representation of an example system for improving navigation through an electronic document collection.

FIG. 1 is a schematic representation of a system 100 for improving navigation through an electronic document collection. System 100 includes a client user terminal 105 and a search engine system 110 for conducting supplemental searches. The supplemental searches identify electronic documents that supplement the context currently displayed for the user at client user terminal 105. In some instances, the supplemental searches can be performed automatically, e.g., without receipt of a trigger from the user. The supplemental searches can be set by a user to identify documents that embody characteristics of the currently displayed context (e.g., a website currently displayed on a browser) to improve navigation through electronic document collection 115, as described further below.

Client user terminal 105 includes one or more data processing devices (e.g., a personal computer, a portable computer, a tablet computer, a smart phone) and a display screen 120. The data processing devices are programmed to perform operations in accordance with the logic of one or more sets of machine readable instructions. The operations include accessing and displaying electronic documents on display screen 120. For example, the data processing devices of client user terminal 105 can execute a web browser or other software program that renders an electronic document 125 for a user. Electronic document 125 can be stored, e.g., on one or more remote document servers in document collection 115 or on a local data storage device of client user terminal 105.

Search engine system 110 is a collection of one or more data processing devices 130 that are programmed to perform search operations on electronic document collection 115. The search operations can include the identification of documents in collection 115 that satisfy constraints. The constraints can be textual constraints (e.g., constraints requiring responsive documents to include or to exclude one or more words or phrases) or non-textual constraints that require responsive documents to have specified non-textual characteristics. Examples of non-textual constraints include constraints requiring responsive documents to be in a specified language, constraints requiring responsive documents to be in a specified file format, constraints requiring responsive documents to be within a specified web site or domain, constraints requiring responsive documents to be dated within a specified time frame, and constraints requiring responsive documents to be stored at a server located within a specified geographic locale. Electronic documents that satisfy the constraints are responsive to search queries that restrict a result set to documents that satisfy those constraints or by being part of a database that is itself restricted to documents that satisfy constraints.

In addition to data processing devices 130, search engine system 110 also includes a search engine database 135 and a search constraint settings database 140. Search engine database 135 is a collection of information stored at one or more persistent data storage devices that characterizes the electronic documents within electronic document collection 115. In general, search engine database 135 is implemented as an index where electronic document addresses and locations within these electronic documents are indexed by keywords found at those locations. The index can be formed, e.g., by a web crawler. Search engine database 135 also includes information characterizing non-textual characteristics of the electronic documents within electronic document collection 115, such as the languages of the electronic documents, file formats of the electronic documents, sites of the electronic documents, domains of the electronic documents, time frames of the electronic documents, and geographic locales of the servers storing the electronic documents. In some implementations, search engine database 135 can be logically subdivided into multiple databases. For example, a first database in search engine database 135 may be constrained to characterizing a subset of the electronic documents within electronic document collection 115, such as electronic documents found at a single domain or electronic documents of a certain type (e.g., reviews, product information, or other document types).

Search constraint setting database 140 is a collection of information stored at one or more persistent data storage devices that characterizes search constraints that are to be used in supplemental searches to restrict the number of responsive documents. The search constraints can be textual or non-textual search constraints. Individual users can set the search constraints used in such supplemental searches, thereby personalizing their supplemental searches and improving their navigation through electronic document collection 115, as described further below.

Electronic document collection 115 is a collection of electronic documents. The documents in electronic document collection 115 can be stored at any of a number of document servers 145, 150, such as document servers for web sites. In some instances, electronic document collection 115 can be, e.g., the electronic documents available on the Internet.

Client user terminal 105, search engine system 110, and electronic document collection 115 are connected for data communication via a data communication network 160. For example, as discussed above, search engine system 110 can crawl electronic document collection 115, client user terminal 105 can retrieve electronic documents from electronic document collection 115 (e.g., for display on display screen 120), and client user terminal 105 can transmit information to search engine system 110 to set the search constraints in search constraint setting database 140 and to characterize the current context displayed on display screen 120. Using the received information, search engine system 110 can conduct supplemental searches and transmit, to client user terminal 105, information characterizing the results of those supplemental searches.

Figure 2:
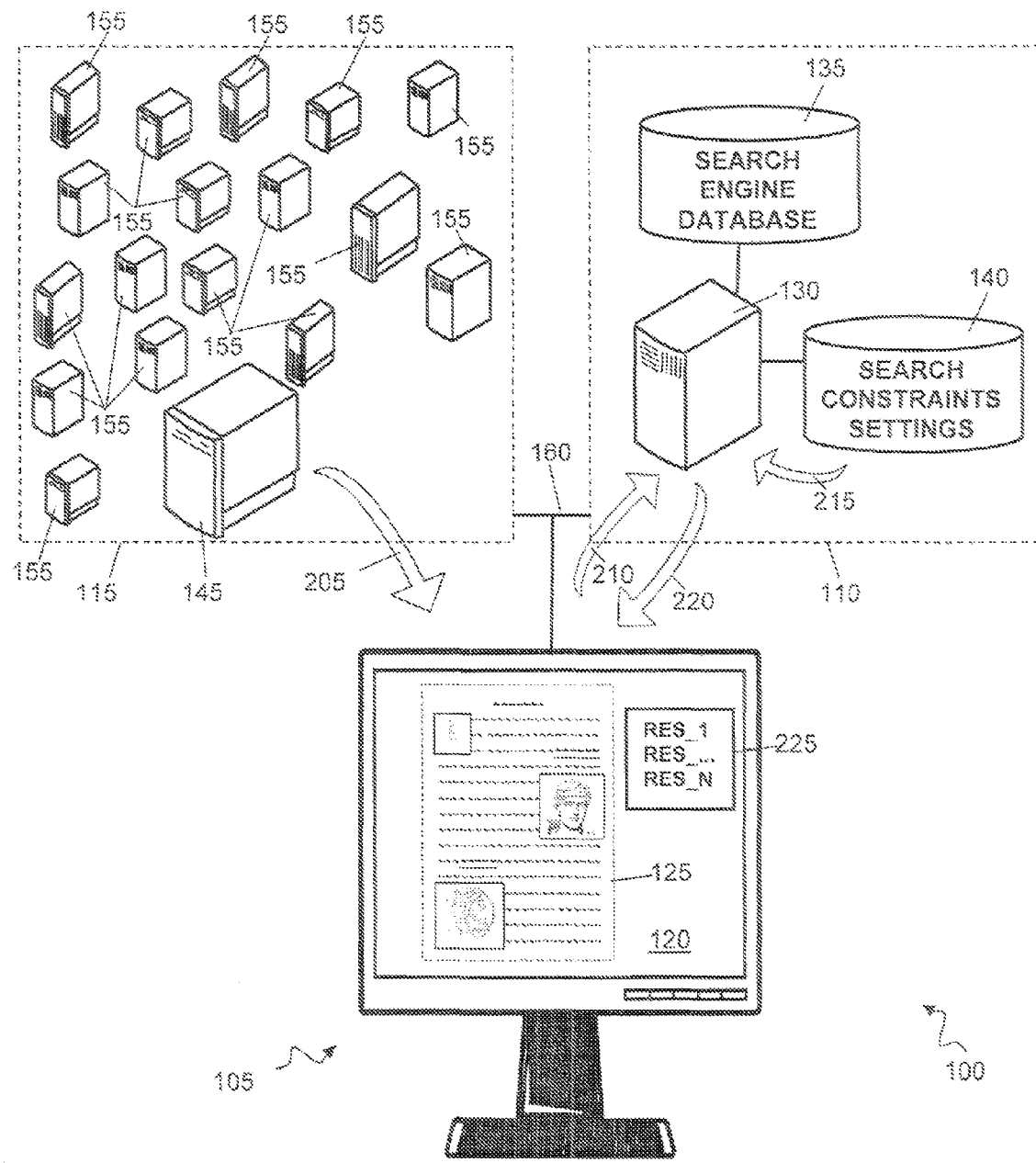
FIG. 2 is a schematic representation of one example of the operation of the system of FIG. 1.

FIG. 2 is a schematic representation of one example of the operation of system 100. As represented by arrow 205, client user terminal 105 downloads an electronic document 125 from document server 145. Electronic document 125 can be, e.g., a document that is made available on the Internet. Electronic document 125 can be rendered on display screen 120, e.g., by a web browser or other software application.

As represented by arrow 210, client user terminal 105 can, in accordance with the logic of the browser or other machine-readable instructions, transmit information characterizing the current context displayed on display screen 120 to search engine system 110 and information identifying the search constraint settings that are to be used in constraining supplemental searches by sending an Hypertext Transfer Protocol (HTTP) request to the search engine system 110, for example. The current context displayed on display screen 120 can be characterized in a variety of different ways. For example, the address where a currently display electronic document 125 is found in electronic document collection 115 (e.g., a Uniform Resource Locator) can be transmitted from client user terminal 105 to search engine system 110. As another example, the context can be characterized by identifying the names of entities found within the text of the currently displayed electronic document 125 and transmitting information characterizing those names to search engine system 110. As yet another example, client user terminal 105 can assemble semantic components of the currently displayed electronic document 125 into one or more context term vectors transmit the context term vectors to search engine system 110.

The search constraint settings that are to be used in constraining supplemental searches can be identified in a variety of different ways. For example, the search constraint settings can be identified by user login information transmitted to search engine system 110, e.g., automatically when search engine system 110 is accessed to conduct searches or access other functionality. Examples of such other functionality include portal services, news aggregation services, electronic mail services, social network services, chat services, and/or text message services. Although represented as a single arrow 210, information characterizing the current context and information identifying the search constraint settings can be transmitted in separate transmissions.

Search engine system 110 receives the information characterizing the current context and the information identifying the search constraint settings. As represented by arrow 215, search engine system 110 can access the identified search constraint settings from search constraint setting database 140. Search engine system 110 then conducts a search on search engine database 135 using both the current context and the identified search constraint settings to constrain the search. In general, search engine system 110 will also rank the responsive search results according to their relevance to a query generated using both the current context and the identified search constraint settings and select a subset of the responsive search results that are most likely to be relevant to the query for transmission.

As represented by arrow 220, search engine system 110 transmits information characterizing at least some of the responsive search results to client user terminal 105. At least some of the received information characterizing the responsive search results can then be displayed on display screen 120 in an area 225. Area 225 can be displayed automatically (i.e., in response to receipt of the information characterizing the responsive search results without further action by a user of client user terminal 105) or in response to interaction by such a user with an input element on client user terminal 105 or elsewhere. Area 225 can be, e.g., a sidebar in a web browser that can be opened or closed as the user desires.

A user may thus be spared the effort of visiting and revisiting a search engine during navigation of electronic document collection 115. Instead, system 100 attempts to anticipate the user's needs for information. Further, a user is spared from entering and re-entering search constraints that specify information of interest. Instead, such search constraints can be stored and used multiple times in different supplemental searches.

Figure 3:
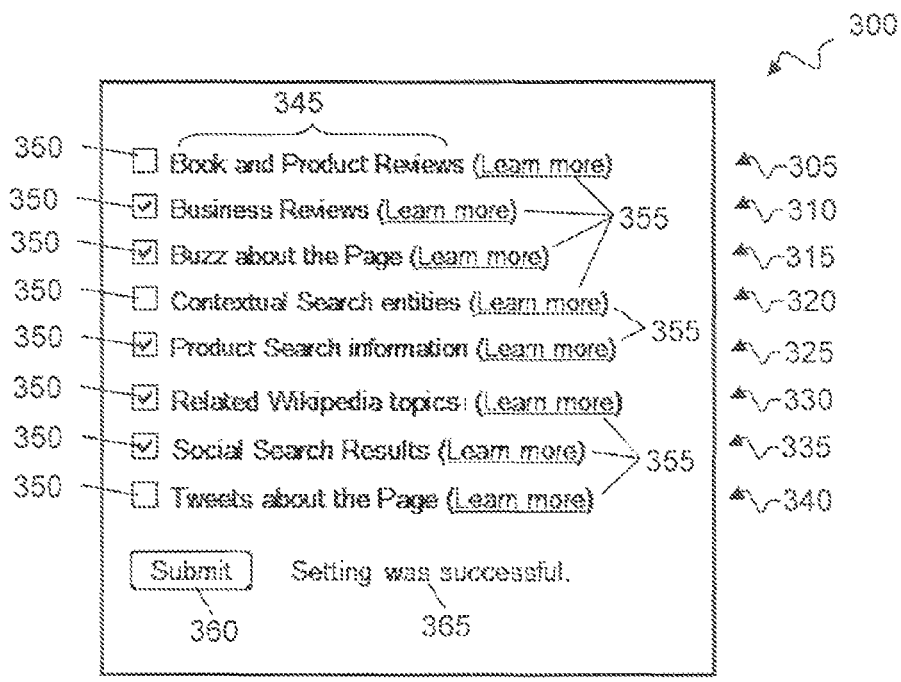
FIGS. 3 and 4 are schematic representations of example portions of user interfaces that can receive a user's settings of search constraints for supplemental searches.

Moreover, the supplemental searches can be used to ensure that the context currently displayed on display screen 120 is appropriately supplemented by the content of the documents in electronic document collection 115. In this regard, any given document that is displayed on display screen 120 may not include information that is of interest to the user. Supplemental searches can be used to gather that information using pre-set search constraints even in the absence of an affirmative request from a user. This can help ensure that all information of interest is made available—even information that is so unlikely to be present that a user would be unlikely to visit a search engine and conduct a separate search on his or her own FIG. 3 is a schematic representation of an example portion 300 of a user interface that can receive a user's settings of search constraints for supplemental searches. User interface portion 300 can be displayed to a user, e.g., by a browser on display screen 120. User interface portion 300 allows a user who presents identifying information to search engine system 110 (e.g., by logged in to functionality provided by search engine system 110) to change the settings in search constraint setting database 140 that are associated with that identifying information.

User interface portion 300 includes a collection of user-selectable settings 305, 310, 315, 320, 325, 330, 335, 340. Each setting 305, 310, 315, 320, 325, 330, 335, 340 includes a description 345 of the setting and a widget 350. Each setting description 345 describes a setting that is to be used to constrain supplemental searches. The settings can be described using, e.g., text. Widgets 350 are interactive input elements that, in response to user interaction, trigger the setting or de-setting the constraints described in setting descriptions 345. In the illustrated implementation, widgets 350 resemble check boxes that, when set, include checks indicating that a particular setting is to be used to constraint supplemental searches.

In the illustrated implementation, each setting 305, 310, 315, 320, 325, 330, 335, 340 also includes a second widget 355 that, in response to user interaction, triggers the display of additional information characterizing the respective of user-selectable settings 305, 310, 315, 320, 325, 330, 335, 340. In the illustrated implementation, widgets 355 are text indicating that a user can "learn more" about the respective of user-selectable settings 305, 310, 315, 320, 325, 330, 335, 340 by interaction with widgets 355.

In the illustrated implementation, user interface portion 300 also includes a submission widget 360 and a setting notification 365. Submission widget 360 is an interactive input element that, in response to user interaction, triggers the submission of changes in user-selectable settings 305, 310, 315, 320, 325, 330, 335, 340 to search engine system 110. Setting notification 365 is text or other indicium indicating that any submission of changes has been successful.

As shown, a variety of different constraints can be set by settings 305, 310, 315, 320, 325, 330, 335, 340. For example, settings 305, 310 constrain supplemental searches to reviews of books, products, and businesses. Reviews are evaluations of the quality or merit of an entity. Thus, a user who has set one of settings 305, 310 can receive the results of supplemental searches that include reviews of books, products, or businesses identified in the context displayed for the user on client user terminal 105.

As another example, settings 315, 335, 340 constrain supplemental searches to content that has been added to document collection 115 by other users who are related to the user for whom the supplemental searches are conducted in one or more machine-implemented social networks. A social network organizes individuals or groups of individuals into "nodes" that are connected by relationships. Social networks can be symmetric or asymmetric. In symmetric social networks, related nodes necessarily share the same relationship with one another. Example machine-implemented symmetric social networks include networks where two or more nodes establish bidirectionally equivalent "friend" or other relationships generally using an invitation/response protocol that effectively requires the consent of both to the relationship. Such bidirectionally equivalent relationships generally provide the same social interaction possibilities to the related nodes.

In contrast, in asymmetric social networks, a first node's relationship to a second node is not necessarily the same as the second node's relationship to the first node. Since the character of the social interaction between nodes in a social network can be defined in accordance with the nature of the relationship between those modes, a first node in an asymmetric social network may interact with a second node in ways that differ from the social interaction provided for the second node to interact with the first node. Examples of a machine-implemented asymmetric social network include networks where a first member may be a follower of a second member without the second member necessarily being a follower of the first. Indeed, in asymmetric social networks, a second member need not even know a first member's identity even though the first member has a relationship to the first member.

In the illustrated implementation, setting 335 constrains supplemental searches to content that has been added to document collection 115 by other users who are related to the user for whom the supplemental searches are conducted in one or more symmetric social networks. In some implementations, the added content is ranked according to the relationship between the other users and the user for whom the supplemental searches are conducted. For example, content added by other users whom are designated as having one type of relationships (e.g., "friend relationships") can be ranked ahead of content added by other users whom are designated as having a second type of relationships (e.g., "co-worker relationships"). For example, content added by other users who are often contacted by the user for whom the supplemental searches are conducted can be ranked ahead of content added by other users who are rarely contacted by the user for whom the supplemental searches are conducted.

In general, the selection of setting 335 is followed by a notification indicating that constraining supplemental searches to content that has been added to document collection 115 by related users involves accessing to that user's social network to identify related users. In some implementations, the notification can be provided prior to the selection of setting 335 and/or explicit confirmation that the user permits access to his/her social network is required.

Setting 340 constrains supplemental searches to content that has been added to document collection 115 by other users who are related to the user for whom the supplemental searches are conducted in a specified asymmetric social network. For example, the supplemental searches could be constrained to content that has been posted by other users who are followed by the user for whom the supplemental searches are conducted. In some implementations, the added content is ranked according to the relationship between the other users and the user for whom the supplemental searches are conducted. For example, content added by other users whom are designated as having one type of relationships (e.g., "friend relationships") can be ranked ahead of content added by other users whom are designated as having a second type of relationships (e.g., "co-worker relationships"). For example, content added by other users who are often contacted by the user for whom the supplemental searches are conducted can be ranked ahead of content added by other users who are rarely contacted by the user for whom the supplemental searches are conducted.

Setting 315 constrains supplemental searches to content that has been added to document collection 115 by other users who are related to the user for whom the supplemental searches are conducted in either symmetric or asymmetric social networks.

As yet another example, setting 320 constrains supplemental searches to contextual searches about entities in the context currently displayed on display screen 120. Contextual searches are searches in which a context is decomposed into semantic components and other documents which share those semantic components are identified. The semantic components of both the currently displayed context and the documents that are searched can be assembled into context term vectors that are compared to identify shared contexts.

As yet another example, setting 325 constrains supplemental searches to searches for products or services described in the context currently displayed on display screen 120. These searches can return, e.g., information identifying offerings of products or services found in the current context, pricing information available, and URL's or other identifiers of real or virtual locations at which the products or services are offered.

As yet another example, setting 330 constrains supplemental searches to searches of sites or domains for, e.g., entities named in the context currently displayed on display screen 120. In the illustrated implementation, setting 330 constrains supplemental searches to searching the Wikipedia domain. However, other settings may constrain supplemental searches to searches of other sites or domains, including domains specified by individual users, as described below. One example of a user specification of a domain to which search is constrained, and indeed searching constrained to individual domains, is available in the "advanced search" features offered by Google, e.g., at http://www.google.com/advanced_search?hl=en.

Figure 4:
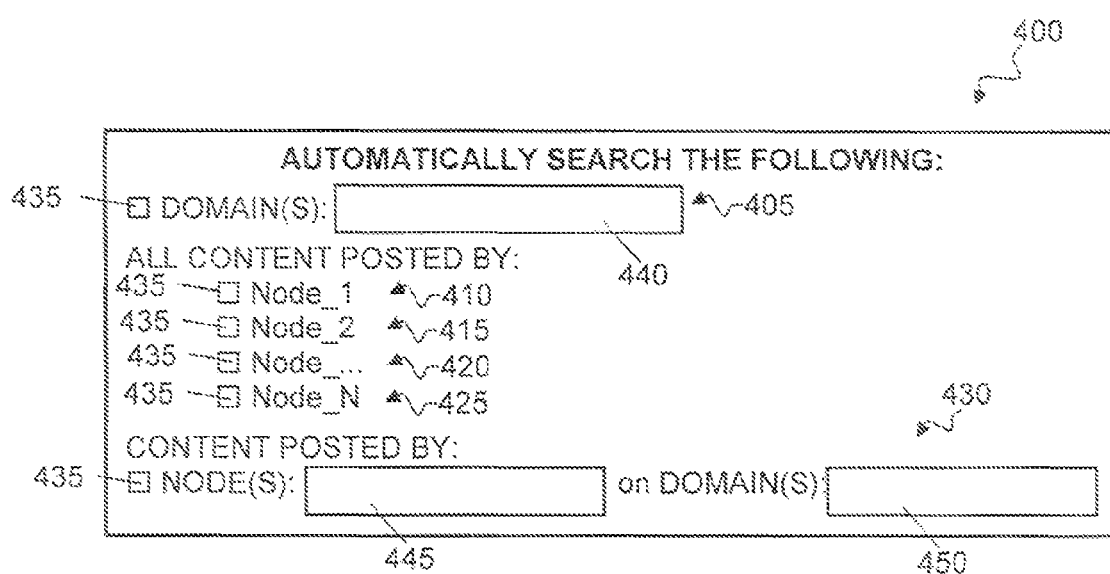

FIG. 4 is a schematic representation of an example portion 400 of another user interface that can receive a user's settings of search constraints for supplemental searches. User interface portion 400 can be displayed to a user, e.g., by a browser on display screen 120. User interface portion 300 allows a user who presents identifying information to search engine system 110 (e.g., by logged in to functionality provided by search engine system 110) to change the settings in search constraint setting database 140 that are associated with that identifying information.

User interface portion 400 includes a collection of user-selectable settings 405, 410, 415, 420, 425, 430 and widgets 435 that, in response to user interaction, trigger the setting or de-setting the constraints described in settings 405, 410, 415, 420, 425, 430.

Setting 405 constrains supplemental searches to searches of user-specified sites or domains. Setting 405 includes a text entry box 440 or other input element that allows a user to specify the domain(s) or the site(s) to which supplemental searchers are to be constrained.

Settings 410, 415, 420, 425 each include an identification of a node in a graph representation of a social network (i.e., Node_1, Node_2, Node_ . . . , Node_N). Settings 410, 415, 420, 425 each constrains supplemental searchers to content that has been added to document collection 115 by the respectively identified individual or group of individuals.

Setting 430 constrains supplemental searches to searches of user-specified sites or domains for content that has been added to the specified sites or domains by a specified individual or group of individuals. Setting 430 includes a text entry box 445 or other input element that allows a user to specify a node in a social network to which supplemental searchers are to be constrained and a text entry box 450 or other input element that allows a user to specify the domain(s) or the site(s) to which these same supplemental searchers are to be constrained.

Figure 5:
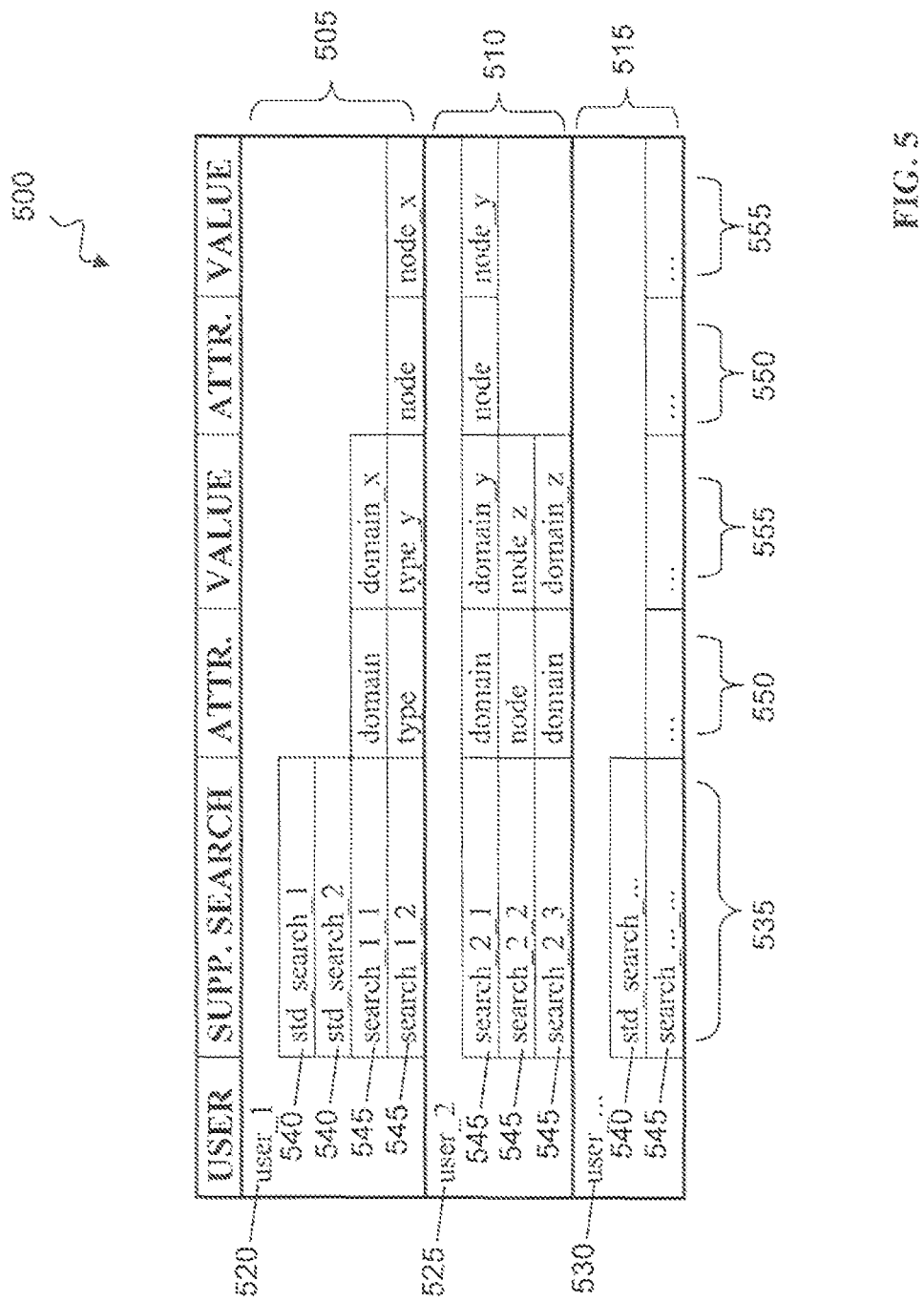
FIG. 5 is a schematic representation of a data structure that stores search constraint settings.

FIG. 5 is a schematic representation of a data structure 500 that stores search constraint settings. Data structure 500 can be used in search constraint setting database 140 (FIG. 1) to store search constrain setting for different users. The search constraint settings can characterize prior user interaction with a user interface that receives the settings, such as user interface portions 300, 400 (FIGS. 3, 4). The search constraint settings can be stored, e.g., in response to user interaction with an interactive input element that triggers the submission of information characterizing user interaction with such a user interface, such as submission widget 360 (FIG. 3).

In the illustrated implementation, data structure 500 is schematically illustrated as a collection of records 505, 510, 515 that are indexed by identifiers 520, 525, 530 of individual users. Other data structures and arrangements are also possible. Each record 505, 510, 515 includes identifiers of one or more supplemental searches that are to be performed for the identified by the respective of identifiers 520, 525, 530 in a column 535. In the illustrated implementation, column 535 includes identifiers 540 of standard searches and identifiers 545 of personalized searches. Standard searches are searches with characteristics that have been standardized for multiple users. For a given display context on display screen 120, the results of the same standard search for different users should be independent of the identity of the users. Examples of standard searches that can be set by user interface portion 300 include settings 305, 310 (which can constrain supplemental searches to the same set of book, product, and business reviews for different users), setting 325 (which can constrain supplemental searches to the same set of electronic documents relating to products or services for different users), and setting 330 (which can constrain supplemental searches to the same sites or domains for different users). In some implementations, standard search identifiers 540 can be used to identify definitions of the constraints of the standard searches, e.g., in another database.

In contrast, personalized searches are searches with characteristics that are personalized to individual users. For a given display context on display screen 120, the results of the personalized searches for different users can yield different results depending on the identity of the user. In the illustrated implementation, data structure 500 includes one or more attribute columns 550 and one or more value columns 555. Attribute columns 550 include identifiers of attributes that have been personalized by the user identified by the respective of identifiers 520, 525, 530. For example, in the illustrated implementation, attribute columns 550 include identifiers of domain attributes, type attributes, and node attributes for personalized supplemental searches. Value columns 555 include values characterizing the associated attributes for the personalized supplemental searches. For example, in the illustrated implementation, value columns 555 include the names of domains, document types (e.g., reviews, product information), and nodes (e.g., individuals or groups of individuals) that have been specified for supplemental searches. As shown, a single supplemental search can be personalized by multiple attributes and values.

The attributes and values in columns 550, 555 can be used to define search queries for the supplemental searches or to select a database in search engine database 135 for the supplemental searches. For example, search queries can be defined so that responsive documents have a particular relationships between the attributes and values in columns 550, 555. Examples of such relationships include documents being "found in" domain(s) specified in column 555, documents being "authored by" node(s) specified in column 555, and documents being "of" type(s) specified in column 555. As another example, supplemental searches or to select a database in search engine database 135 that indexes electronic documents found in a single domain or electronic documents of a particular document type.

Figure 6:
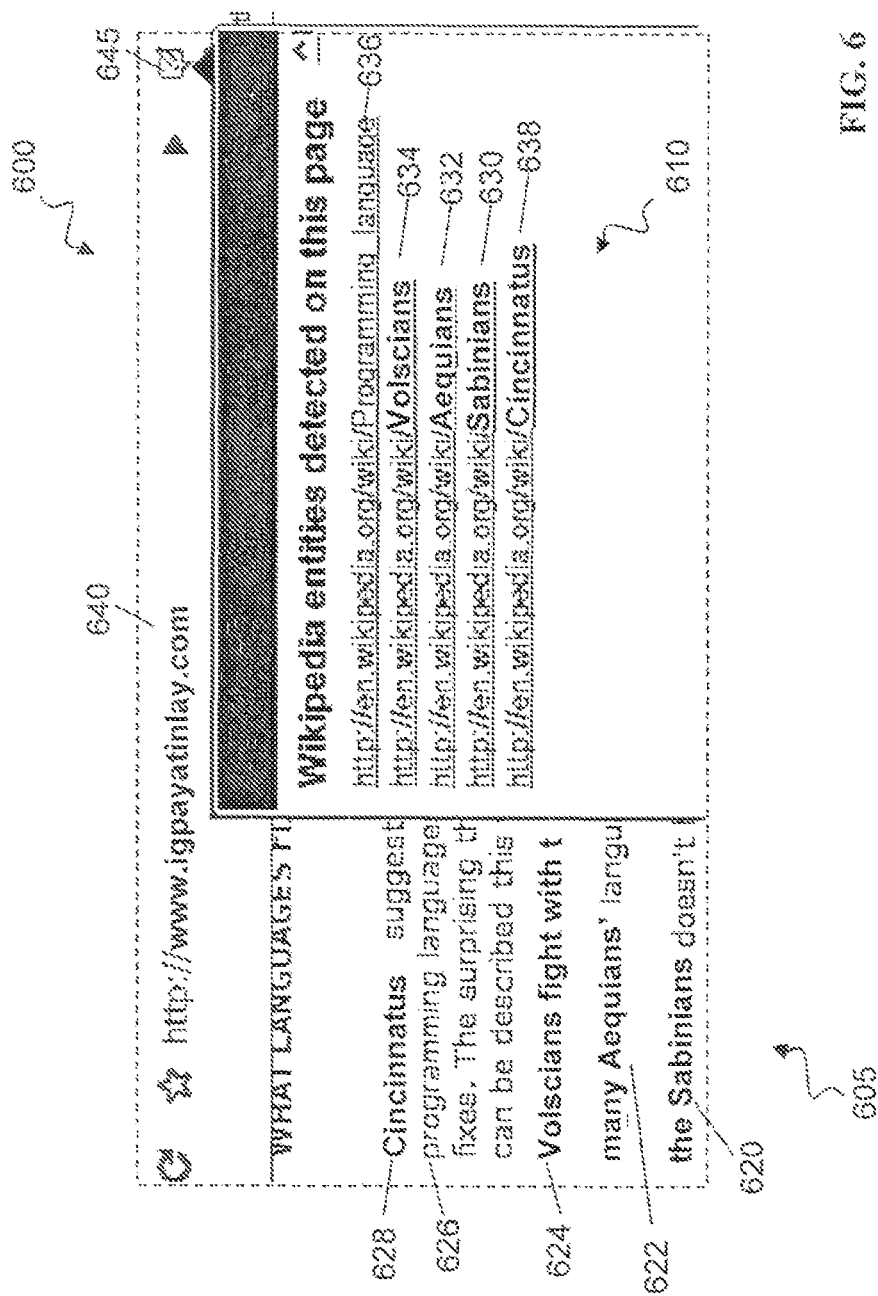

FIG. 6 is a schematic representation of an example portion 600 of a user interface that can display results of supplemental searches to a user. User interface portion 600 can be displayed, e.g., by a browser on display screen 120. The supplemental search results in user interface portion 600 can be responsive to a search that embodies both the search constraint settings that the user has set in search constraint setting database 140 and the context currently displayed on display screen 120.

User interface portion 600 includes a presentation 605 of the current context and a presentation 605 of supplemental search results. Current context presentation 605 includes content of one or more electronic documents in electronic document collection 115. In the illustrated implementation, current context presentation 605 presents the text of an electronic document, including the names 620, 622, 624, 626, 628 or other identifiers of various entities. The entities can be, e.g., individuals (e.g., "Cinncinatus"), groups of individuals or political entities (e.g., 'Volscians," "Aequians," and "Sabinians"), business entities, products, concepts (e.g., "programming language"), or other identifiable units.

Supplemental search result presentation 610 includes identifiers 630, 632, 634, 636, 638 of search results that are responsive to a search that embodies both by the context displayed in current context presentation 605 and the search constraint settings in search constraint setting database 140. In the illustrated implementation, the search results identifiers 630, 632, 634, 636, 638 are links to electronic documents in electronic document collection 115 that are both relevant to respective entities named in current context presentation 605 by names 620, 622, 624, 626, 628 and that are found at a particular domain (i.e., the WIKIPEDIA.ORG domain). Thus, search results identifiers 630, 632, 634, 636, 638 can identify the results of a search that has been constrained by setting 330 (FIG. 3.)

In the illustrated implementation, multiple supplemental searches have been conducted (i.e., one for each name 620, 622, 624, 626, 628) and a single supplemental search result is identified for each named entity. In particular, search result identifier 630 is the result of one search constrained to a domain and entity name 620, search result identifier 632 is the result of a first search constrained to the same domain but a second entity name 622, search result identifier 630 is the result of a second search constrained to the same domain but a third entity name 624, search result identifier 630 is the result of a third search constrained to the same domain but a third entity name 624, search result identifier 636 is the result of a fourth search constrained to the same domain but a fourth entity name 626, and search result identifier 638 is the result of a fifth search constrained to the same domain but a fifth entity name 628. This is not necessarily the case. For example, in some implementations, multiple supplemental search results can be identified for each named entity. As another example, in some implementations, a single supplemental search can be conducted for multiple named entities and one or more search results identified.

In the illustrated implementation, user interface portion 600 is rendered by a browser. A browser is a computer program that accesses and displays electronic documents and other data available on the Internet and elsewhere. The illustrated browser includes an address bar that presents an identifier 640 of an electronic document that is currently displayed in current context presentation 605 and a supplemental search result display widget 645. Supplemental search result display widget 645 is an interactive input element that, in response to user interaction, triggers the display of supplemental search result presentation 610. In the illustrated implementation, supplemental search result presentation 610 is presented overlaid upon current context presentation 605, but other arrangements are possible.

Figure 7:
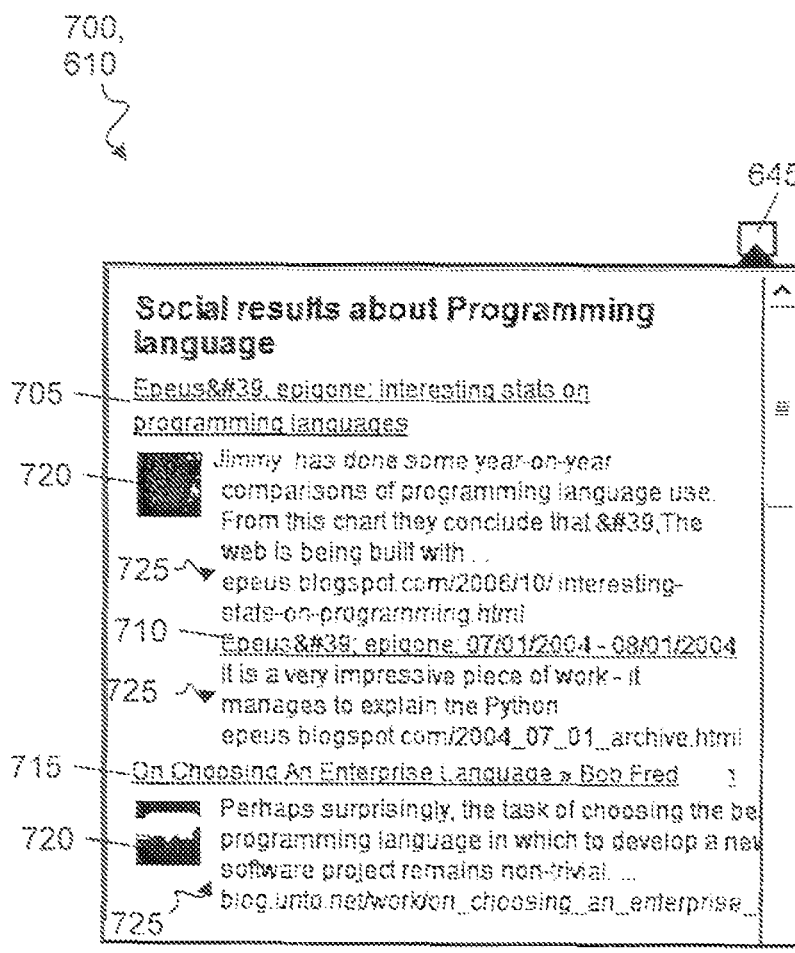

FIG. 7 is a schematic representation of an example portion 700 of a user interface that can display results of supplemental searches to a user. User interface portion 700 can be displayed, e.g., by a browser on display screen 120. The supplemental search results in user interface portion 700 can be responsive to a search query that embodies both the search constraints that the user has set in search constraint setting database 140 and the context currently displayed on display screen 120.

In particular, user interface portion 700 includes presentation 610 of supplemental search results that are constrained by the names of entities in the current context and to content that has been added to document collection 115 by other users who are related to the user for whom the supplemental searches are conducted. Thus, supplemental search results presentation 610 can present the results of a search that has been constrained by setting 335 (FIG. 3.)

Supplemental search result presentation 610 includes identifiers 705, 710, 715 of search results that are responsive to the search. In the illustrated implementation, supplemental search result presentation 610 also includes likenesses 720 and text snippets 725 characterizing the responsive search results. In the illustrated implementation, information identifying the users who added the content is includes in search result identifiers 705, 710, 715 (e.g., the name "Bob Fred" in identifier 715). In other implementations, information identifying the users who added the content can be displayed in presentation 610 separate from identifiers 705, 710, 715.

Figure 8:
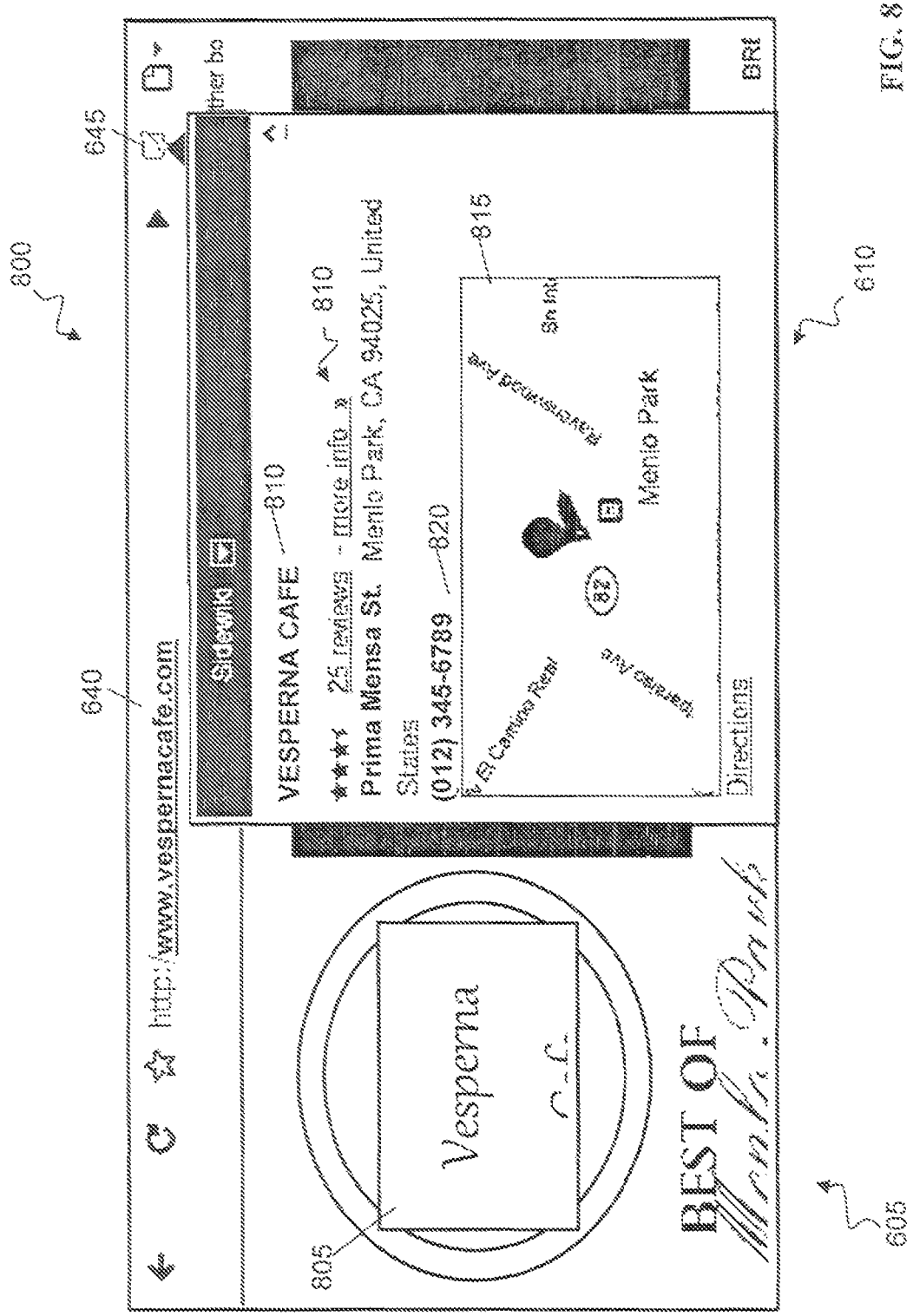

FIG. 8 is a schematic representation of an example portion 800 of a user interface that can display results of supplemental searches to a user. User interface portion 800 can be displayed, e.g., by a browser on display screen 120. The supplemental search results in user interface portion 800 can be responsive to a search query that embodies both the search constraints that the user has set in search constraint setting database 140 and the context currently displayed on display screen 120.

In particular, user interface portion 800 includes current context presentation 605 and supplemental search result presentation 610. In the illustrated implementation, current context presentation 605 presents content from the website of a good or service provider that is found in electronic document collection 115, namely, the website of a café entitled "Vesperna Café." The content presented in current context presentation 605 includes the name 805 of the good or service provider. The supplemental search results presented in supplemental search result presentation 610 are constrained by name 805 and the search constrain setting to find location and review content. Thus, supplemental search results presentation 610 can present the results of a search that has been constrained by setting 310 (FIG. 3.)

In the illustrated implementation, supplemental search result presentation 610 includes an identifier 810 of the entity name used to constrain the supplemental search, review information 810 drawn from electronic document collection 115 that characterizes the entity used to constrain the supplemental search and location 815 and contact 820 information for the entity.

Figure 9:
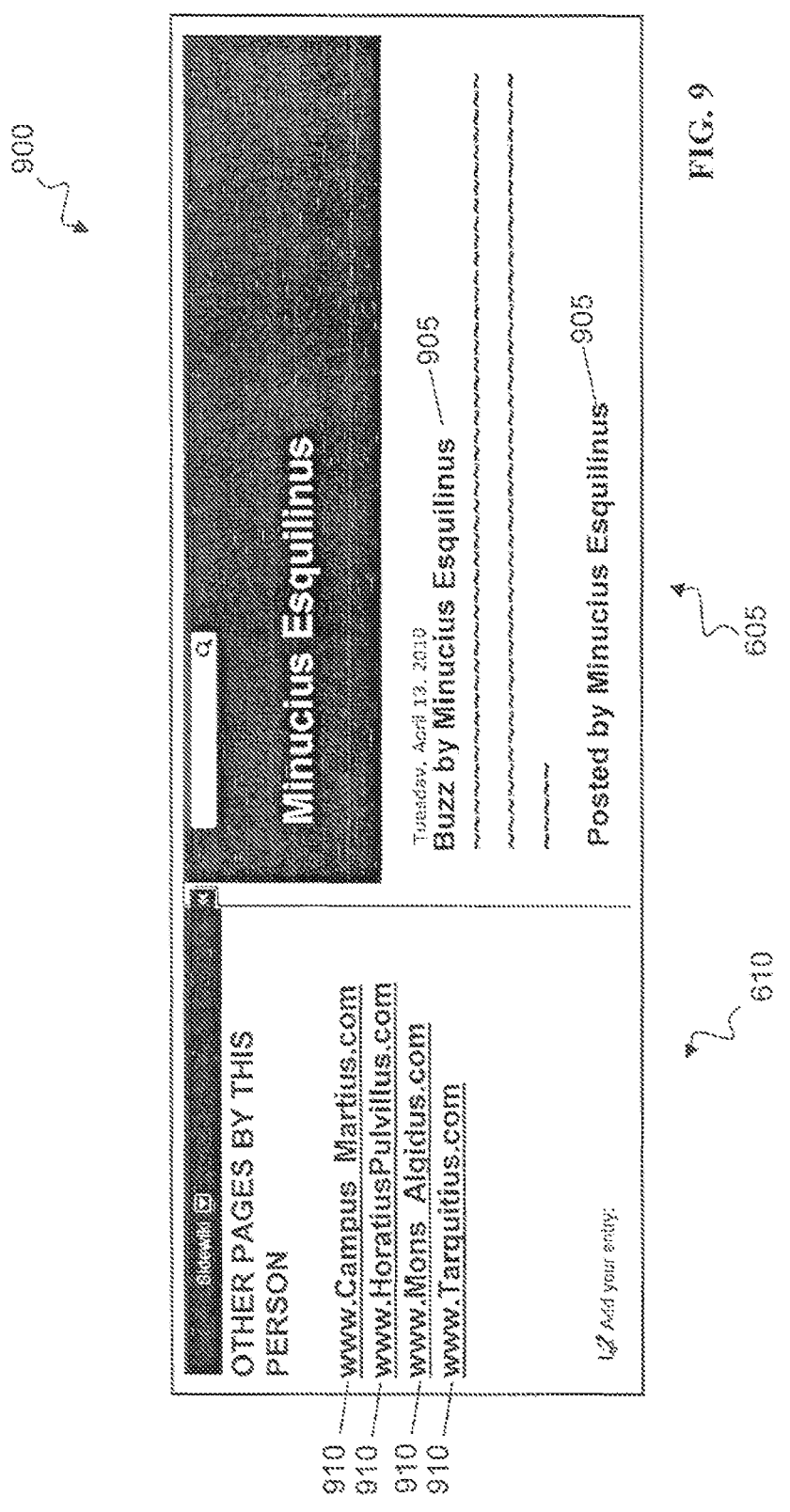

FIG. 9 is a schematic representation of an example portion 900 of a user interface that can display results of supplemental searches to a user. User interface portion 900 can be displayed, e.g., by a browser on display screen 120. The supplemental search results in user interface portion 900 can be responsive to a search query that embodies both the search constraints that the user has set in search constraint setting database 140 and the context currently displayed on display screen 120.

In particular, user interface portion 900 includes current context presentation 605 and supplemental search result presentation 610. In the illustrated implementation, current context presentation 605 presents content from a blog in electronic document collection 115, namely, the blog entitled "Minucius Esquilinus." The content presented in current context presentation 605 includes the name 905 of the author of the blog (also Minucius Esquilinus). The supplemental search results presented in supplemental search result presentation 610 are constrained to documents authored by the author named by name 905. In the illustrated implementation, supplemental search result presentation 610 includes identifiers 910 of other documents in electronic document collection 115 authored by the author named by name 905.

FIG. 11 is a schematic representation of an example portion 1100 of a user interface that can display results of supplemental searches to a user. User interface portion 1100 can be displayed, e.g., by a browser on display screen 120. The supplemental search results in user interface portion 1100 can be responsive to two or more supplemental searches that embody both the search constraint settings that the user has set in search constraint setting database 140 and the context currently displayed on display screen 120.

User interface portion 1100 includes a presentation 605 of the current context and a presentation 610 of supplemental search results. Supplemental search results presentation 610 includes the results 1105, 1110 of two different supplemental searches. In particular, supplemental search results 1105 are relevant to respective entities named in current context presentation 605 and are found at a particular domain (i.e., the WIKIPEDIA.ORG domain). Supplemental search results 1110 are relevant to respective entities named in current context presentation 605 and have been added to document collection 115 by other users who are related to the user for whom the supplemental searches are conducted. Thus, supplemental search results presentation 610 can present the results of different supplemental searches that have been respectively constrained by settings 330, 335 (FIG. 3.)

Figure 10:
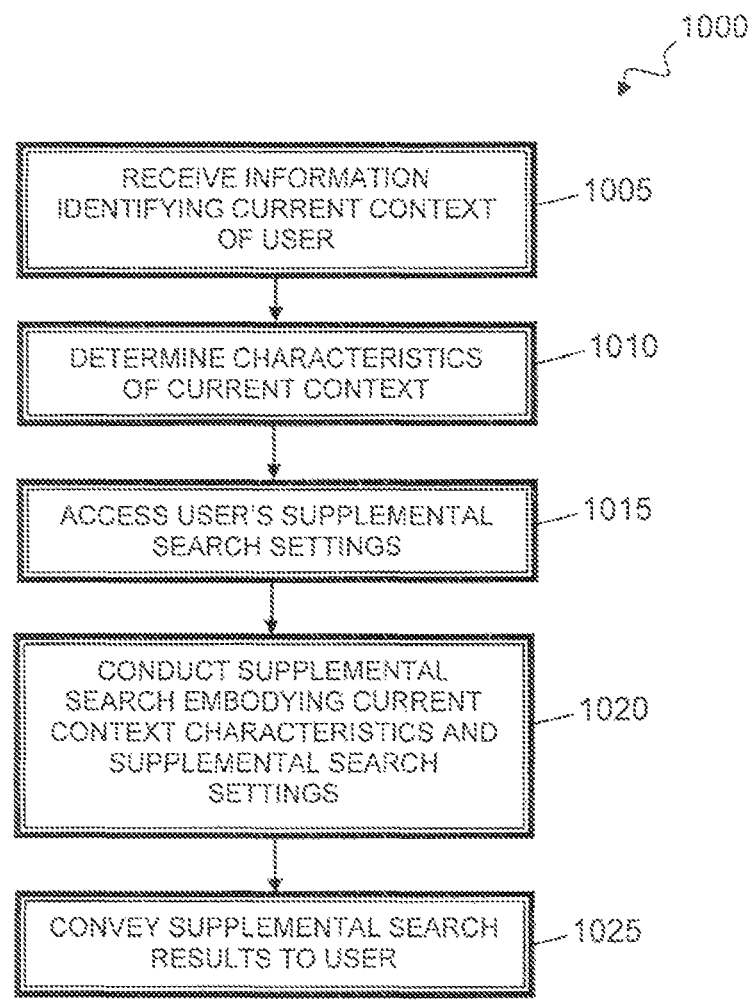
FIG. 10 is a flowchart of an example process for improving navigation through an electronic document collection.

FIG. 10 is a flowchart of a process 1000 for improving navigation through an electronic document collection. Process 1000 can be performed by one or more data processing devices in accordance with the logic of one or more sets of machine readable instructions. For example, process 1000 can be performed in system 100 by data processing devices 130 of search engine system 110, acting alone or on concert with one or more data processing devices at client user terminal 105.

The system performing process 1000 receives information identifying the current context displayed for a user at client user terminal 105 at 1005. The identifying information can be, e.g., an address of a currently displayed web-page or all or a portion of the currently displayed content. In implementations where process 1000 is performed by data processing devices 130 of search engine system 110, the information identifying the current context can be received in one or more messages transmitted from client user terminal 105 to search engine system 110.

The system performing process 1000 determines characteristics of the current context that are suitable for constraining supplemental searches at 1010. In some implementations, the characteristics that are determined from the current context are the names of entities found in the current context. Examples of such entity names include names 620, 622, 624, 626, 628, 805, 905 (FIGS. 6, 8, 9). The system can identify entity names using a variety of different approaches, including analyzing the text of an electronic document that forms the current context (e.g., identifying capitalized words and phrases, identifying noun phrases), comparing the text of an electronic document with the titles of encyclopedia (e.g., Wikipedia) entries, and the like. As another example, contextual characteristics of a document displayed in the current context are determined. For example, distinctive or uncommon words can be identified in the current context and used as constraints in the supplemental searches. As another example, one or more context term vectors that embody semantic components of the currently displayed electronic document 125 can be used as constraints in the supplemental searches.

The characteristics of the current context can be determined, e.g., directly from an electronic document in the current context or from a database that includes information characterizing an electronic document in the current context. For example, in implementations where process 1000 is performed by data processing devices 130 of search engine system 110, data processing devices 130 can receive all or a portion of an electronic document in the current context from client user terminal 105 or from electronic document collection 115. As another example, in implementations where process 1000 is performed in conjunction with one or more data processing devices at client user terminal 105, such data processing devices can determine the characteristics of the current context and send one or messages characterizing the results of this determination to search engine system 110.

In some implementations, the characteristics of the current context can be determined from sources that are not currently displayed on the display screen 120. For example, characteristics of the current context can also be determined from the browsing history of the user for whom supplemental searches are conducted. As another example, characteristics of the current context can also be determined from interests of the user for whom supplemental searches are conducted. Such interests can be determined, e.g., from groups that the user has joined in a social network. As another example, characteristics of the current context can also be determined from the characteristics of other users who are related, in a social network, to the user for whom supplemental searches are conducted. For example, if the user for whom supplemental searches are conducted follows an athlete on an asymmetric social network, the system performing process 1000 can be more likely to interpret the current context as related to the sport played by that athlete.

The system performing process 1000 accesses a user's supplemental search settings at 1015. The supplemental search settings can be stored, e.g., at search constraint setting database 140 (FIG. 1) in one or more data structures (e.g., data structure 500 (FIG. 5).

The system performing process 1000 conducts a supplemental search that embodies both the determined (at 1010) characteristics of the current context and the accessed (at 1015) supplemental search settings at 1020. The supplemental search can embody these in a variety of different ways. For example, in some implementations, queries are formulated that include the determined characteristics and the accessed search settings as constraints. As another example, databases selected for a supplemental search are limited to those that satisfy one or more of the constraints. For example, in response to a search setting indicating that a supplemental search is to be constrained to a single domain, the supplemental search can be constrained to searching only that domain. As yet another example, a combination of these approaches can be used. In implementations where process 1000 is performed by data processing devices 130 of search engine system 110, the supplemental search can be conducted on search engine database 135.

The system performing process 1000 conveys the supplemental search results to the user at 1025. In implementations where process 1000 is performed by data processing devices 130 of search engine system 110, the supplemental search results can be conveyed to the user by transmitting one or more messages characterizing the supplemental search results to client user terminal 105. The conveyance of supplemental search results to the user can also include displaying the supplemental search results on display screen 120, e.g., in one or more portions 600, 700, 900, 900 (FIGS. 6, 7, 8, 9) of a user interface.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Thus, particular implementations have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing devices, the method comprising:
   providing, by the one or more data processing devices, a user interface that is for display to a first user at a first remote client terminal and that lists a plurality of searchable resources;
   receiving, by the one or more data processing devices, user input that is elicited by the user interface and that indicates a selection of a selected subset of searchable resources of the plurality of searchable resources that are to be searched during an automatic search;
   associating, by the one or more data processing devices and in response to having received the user input, the selected subset of searchable resources with the first user as resources to be searched during an automatic search performed in relation to the first user;
   providing, by the one or more data processing devices and after the one or more data processing devices have associated the selected subset of searchable resources with the first user, content in an electronic document for display to the first user at the first remote client terminal;
   identifying, by the one or more data processing devices, a social group that the first user has joined in a social network;
   determining a theme of the identified social group;
   associating, by the one or more data processing devices, the theme of the identified social group with the first user as an identified interest of the first user;
   identifying, by the one or more data processing devices, a relevant search term contained within the content in the electronic document provided for display at the first remote client terminal, based on the relevant search term that is contained within the content being related to the identified interest of the first user that was determined based on the theme of the identified social group;
   generating, by the one or more data processing devices, one or more queries based on the relevant search term;
   retrieving the selected subset of searchable resources that are associated with the first user;
   identifying a plurality of search results from one or more of the subset of the selected subset of searchable resources, each search result being responsive to the one or more queries;
   providing the plurality of search results to the first remote client terminal for display;
   identifying, by the one or more data processing devices a second user that the first user follows on an asymmetric social network;
   determining a characteristic of the second user;
   associating, by the one or more data processing devices, the characteristic of the second user with the first user as an additional identified interest of the first user;
   identifying, by the one or more data processing devices, another relevant search term contained within the content in the electronic document provided for display at the first remote client terminal, based on the another relevant search term that is contained within the content being related to the additional identified interest of the first user that was determined based on the characteristic of the second user; and
   generating, by the one or more data processing devices, one or more additional queries based on the another relevant search term;
   wherein identifying the plurality of search results includes identifying one or more additional search results that are responsive to the one or more additional queries.

2. The method of claim 1, further comprising receiving conformation by the first user that access to the social network is permitted.

3. The method of claim 1 wherein identifying the plurality of search results comprises:
   receiving selection by the first user of one or more social network users; and
   searching the social network for content posted by the social network users.

4. The method of claim 1 wherein identifying the plurality of search results comprises:
   receiving, prior to providing the content in the electronic document for display to the first user at the first remote client terminal, selection by the first user of one or more domains; and
   searching the domains for content posted by the social network users.

5. The method of claim 1, wherein generating one or more additional queries based on the another relevant search term includes generating at least one additional query based on both the relevant search term and the another relevant search term.

6. A system comprising:
   one or more computers programmed to perform operations comprising:
   providing, by the one or more data processing devices, a user interface that is for display to a first user at a first remote client terminal and that lists a plurality of searchable resources;
   receiving, by the one or more data processing devices, user input that is elicited by the user interface and that indicates a selection of a selected subset of searchable resources of the plurality of searchable resources that are to be searched during an automatic search;

associating, by the one or more data processing devices and in response to having received the user input, the selected subset of searchable resources with the first user as resources to be searched during an automatic search performed in relation to the first user;

providing, by the one or more data processing devices and after the one or more data processing devices have associated the selected subset of searchable resources with the first user, content in an electronic document for display to the first user at the first remote client terminal;

identifying, by the one or more data processing devices, a social group that the first user has joined in a social network;

determining a theme of the identified social group;

associating, by the one or more data processing devices, the theme of the identified social group with the first user as an identified interest of the first user;

identifying, by the one or more data processing devices, a relevant search term contained within the content in the electronic document provided for display at the first remote client terminal, based on the relevant search term that is contained within the content being related to the identified interest of the first user that was determined based on the theme of the identified social group;

generating, by the one or more data processing devices, one or more queries based on the relevant search term;

retrieving the selected subset of searchable resources that are associated with the first user;

identifying a plurality of search results from one or more of the subset of the selected subset of searchable resources, each search result being responsive to the one or more queries;

providing the plurality of search results to the first remote client terminal for display;

identifying, by the one or more data processing devices a second user that the first user follows on an asymmetric social network;

determining a characteristic of the second user;

associating, by the one or more data processing devices, the characteristic of the second user with the first user as an additional identified interest of the first user;

identifying, by the one or more data processing devices, another relevant search term contained within the content in the electronic document provided for display at the first remote client terminal, based on the another relevant search term that is contained within the content being related to the additional identified interest of the first user that was determined based on the characteristic of the second user; and generating, by the one or more data processing devices, one or more additional queries based on the another relevant search term;

wherein identifying the plurality of search results includes identifying one or more additional search results that are responsive to the one or more additional queries.

7. The system of claim 6 wherein the operations further comprise receiving conformation by the first user that access to the social network is permitted.

8. The system of claim 6 wherein identifying the plurality of search results comprises:

receiving selection by the first user of one or more social network users; and searching the social network for content posted by the social network users.

9. The system of claim 6 wherein identifying the plurality of search results comprises:

receiving, prior to providing the content in the electronic document for display to the first user at the first remote client terminal, selection by the first user of one or more domains; and searching the domains for content posted by the social network users.

10. The system of claim 6, wherein generating one or more additional queries based on the another relevant search term includes generating at least one additional query based on both the relevant search term and the another relevant search term.

11. A computer storage medium storing computer program instructions that, when executed by one or more computers, cause the computers to perform operations comprising:

providing, by the one or more data processing devices, a user interface that is for display to a first user at a first remote client terminal and that lists a plurality of searchable resources;

receiving, by the one or more data processing devices, user input that is elicited by the user interface and that indicates a selection of a selected subset of searchable resources of the plurality of searchable resources that are to be searched during an automatic search;

associating, by the one or more data processing devices and in response to having received the user input, the selected subset of searchable resources with the first user as resources to be searched during an automatic search performed in relation to the first user;

providing, by the one or more data processing devices and after the one or more data processing devices have associated the selected subset of searchable resources with the first user, content in an electronic document for display to the first user at the first remote client terminal;

identifying, by the one or more data processing devices, a social group that the first user has joined in a social network;

determining a theme of the identified social group;

associating, by the one or more data processing devices, the theme of the identified social group with the first user as an identified interest of the first user;

identifying, by the one or more data processing devices, a relevant search term contained within the content in the electronic document provided for display at the first remote client terminal, based on the relevant search term that is contained within the content being related to the identified interest of the first user that was determined based on the theme of the identified social group;

generating, by the one or more data processing devices, one or more queries based on the relevant search term;

retrieving the selected subset of searchable resources that are associated with the first user;

identifying a plurality of search results from one or more of the subset of the selected subset of searchable resources, each search result being responsive to the one or more queries; and providing the plurality of search results to the first remote client terminal for display;

identifying, by the one or more data processing devices a second user that the first user follows on an asymmetric social network;

determining a characteristic of the second user;
associating, by the one or more data processing devices, the characteristic of the second user with the first user as an additional identified interest of the first user;
identifying, by the one or more data processing devices, another relevant search term contained within the content in the electronic document provided for display at the first remote client terminal, based on the another relevant search term that is contained within the content being related to the additional identified interest of the first user that was determined based on the characteristic of the second user; and
generating, by the one or more data processing devices, one or more additional queries based on the another relevant search term;

wherein identifying the plurality of search results includes identifying one or more additional search results that are responsive to the one or more additional queries.

12. The computer instructions of claim 11 wherein the operations further comprise receiving conformation by the first user that access to the social network is permitted.

13. The computer instructions of claim 11 wherein identifying the plurality of search results comprises:
receiving selection by the first user of one or more social network users; and
searching the social network for content posted by the social network users.

14. The computer instructions of claim 11 wherein identifying the plurality of search results comprises:
receiving, prior to providing the content in the electronic document for display to the first user at the first remote client terminal, selection by the first user of one or more domains; and
searching the domains for content posted by the social network users.

15. The computer instructions of claim 11, wherein generating one or more additional queries based on the another relevant search term includes generating at least one additional query based on both the relevant search term and the another relevant search term.

\* \* \* \* \*